United States Patent
Iwashiro et al.

(10) Patent No.: US 8,817,416 B2
(45) Date of Patent: Aug. 26, 2014

(54) MAGNETIC DISK DEVICE AND METHOD OF CONTROLLING MAGNETIC HEADS

(71) Applicant: Kabushiki Kaisha Toshiba, Tokyo (JP)

(72) Inventors: Masafumi Iwashiro, Kanagawa (JP); Kazuhiko Takaishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/804,412

(22) Filed: Mar. 14, 2013

(65) Prior Publication Data
US 2014/0198407 A1 Jul. 17, 2014

(30) Foreign Application Priority Data
Jan. 11, 2013 (JP) .................................. 2013-003312

(51) Int. Cl.
G11B 5/596 (2006.01)
G11B 5/55 (2006.01)

(52) U.S. Cl.
CPC .................................... G11B 5/5547 (2013.01)
USPC ........................................................ 360/78.09

(58) Field of Classification Search
None
See application file for complete search history.

(56) References Cited

U.S. PATENT DOCUMENTS

2009/0195913 A1* 8/2009 Takakura ........................ 360/75
2013/0329313 A1* 12/2013 Zhang et al. .................... 360/51

FOREIGN PATENT DOCUMENTS

| JP | 199002-206804 A | 8/1990 |
| JP | 199305-094674 A | 4/1993 |
| JP | 199810-171505 A | 6/1998 |

* cited by examiner

Primary Examiner — Regina N Holder
(74) Attorney, Agent, or Firm — Posz Law Group, PLC

(57) ABSTRACT

According to one embodiment, a magnetic disk device includes: magnetic heads; a magnetic disk in which servo patterns having different write frequencies from one another are divided and recorded into a plurality of zones; and a head controller configured such that, when performing seek control of the magnetic heads based on a model position and a model velocity obtained from a model which simulates the magnetic heads, the head controller corrects the model position and the model velocity, at the time of switching of the zones, so as to reflect variation of sampling time resulting from gaps between the zones.

7 Claims, 6 Drawing Sheets

MAGNETIC DISK DEVICE AND METHOD OF CONTROLLING MAGNETIC HEADS

CROSS-REFERENCE TO RELATED APPLICATIONS

This application is based upon and claims the benefit of priority from Japanese Patent Application No. 2013-3312, filed on Jan. 11, 2013; the entire contents of which are incorporated herein by reference.

FIELD

Embodiments described herein relate generally to a magnetic disk device and a method of controlling magnetic heads.

BACKGROUND

In a magnetic disk device, in order to perform seek control of magnetic heads, the amount of manipulation is obtained using a model, which simulates a control target (model-following seek control). Also, in order to increase a data area in which user data is written, there is a method of dividing servo patterns into a plurality of zones from the inner circumference of the magnetic disk toward the outer circumference thereof, and raising a write frequency (reference frequency) of servo patterns of zones of the outer circumference with respect to zones of the inner circumference.

DETAILED DESCRIPTION

In general, according to one embodiment, a magnetic disk device includes: magnetic heads; a magnetic disk in which servo patterns having different write frequencies from one another are divided and recorded into a plurality of zones; and a head controller configured such that, when performing seek control of the magnetic heads based on a model position and a model velocity obtained from a model which simulates the magnetic heads, the head controller corrects the model position and the model velocity, at the time of switching of the zones, so as to reflect variation of sampling time resulting from gaps between the zones.

Hereinafter, magnetic disk devices according to embodiments will be described in detail with reference to the accompanying drawings. Furthermore, the present invention is not limited by these embodiments.

Figure 1:
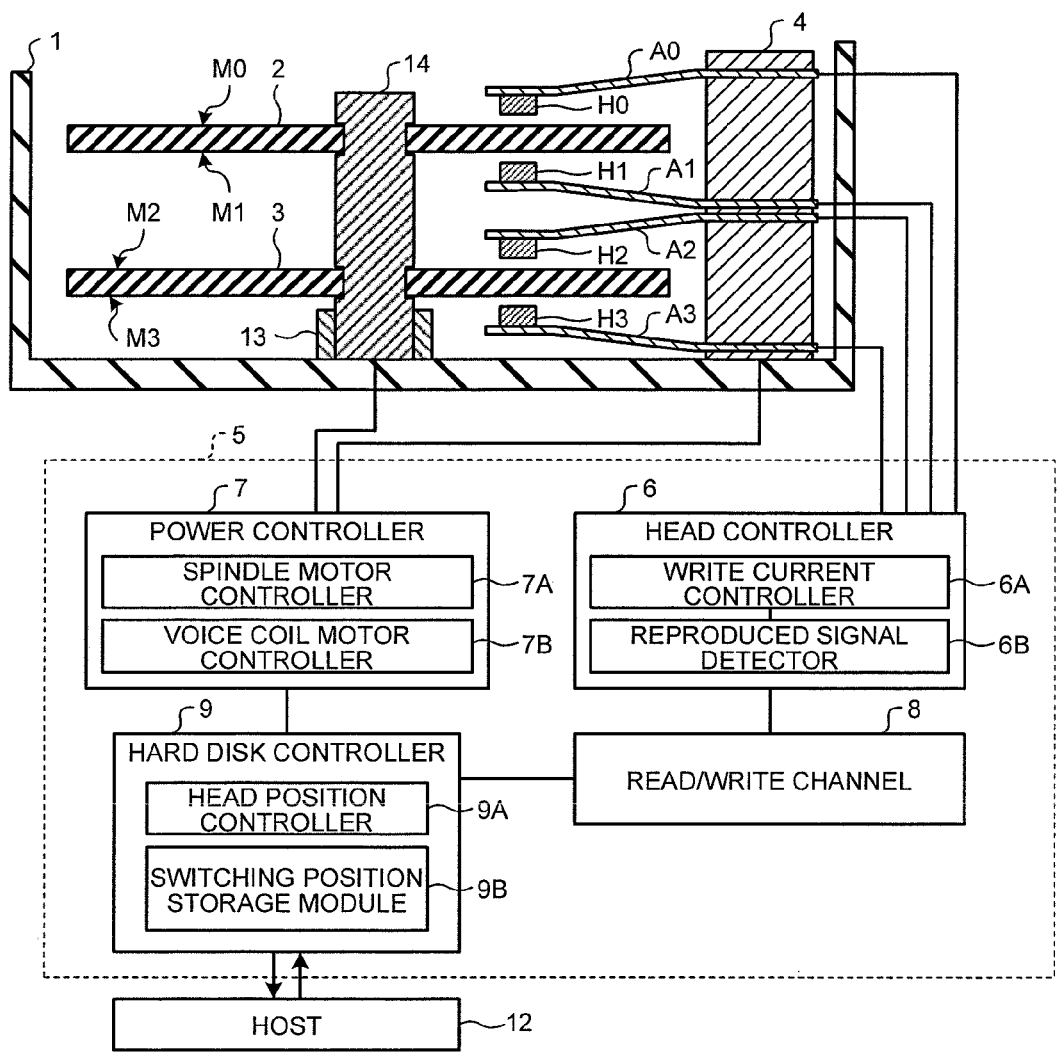
FIG. 1 is a block diagram illustrating a schematic configuration of a magnetic disk device according to a first embodiment.

FIG. 1 is a block diagram illustrating a schematic configuration of a magnetic disk device according to a first embodiment.

Referring to FIG. 1, the magnetic disk device is provided with a plurality of magnetic disks 2 and 3. Disk surfaces M0 and M1 are provided on both sides of the magnetic disk 2, respectively, and disk surfaces M2 and M3 are provided on both sides of the magnetic disk 3, respectively. The magnetic disks 2 and 3 are integrally supported through a spindle 14.

Also, the magnetic disk device is provided with magnetic heads H0 to H3 for the disk surfaces M0 to M3, respectively, and the magnetic heads H0 to H3 are arranged to face the disk surfaces M0 to M3, respectively. The magnetic heads H0 to H3 are held on the disk surfaces M0 to M3, respectively, through arms A0 to A3, respectively. The arms A0 to A3 can make the magnetic heads H0 to H3 slide within horizontal surfaces, respectively.

Figure 2A:
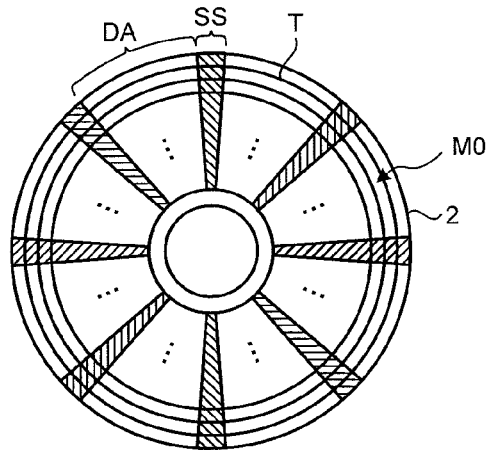
FIG. 2A is a plane view illustrating track arrangement of the magnetic disk of FIG. 1.

As illustrated in FIG. 2A, the disk surface M0 is, for example, provided with tracks T along the circumferential direction. Each of the tracks T is provided with data areas DA in which user data is to be written, and servo areas SS in which servo data is written. The servo areas SS are radially arranged, and the data areas DA are arranged between the servo areas SS.

Figure 2B:
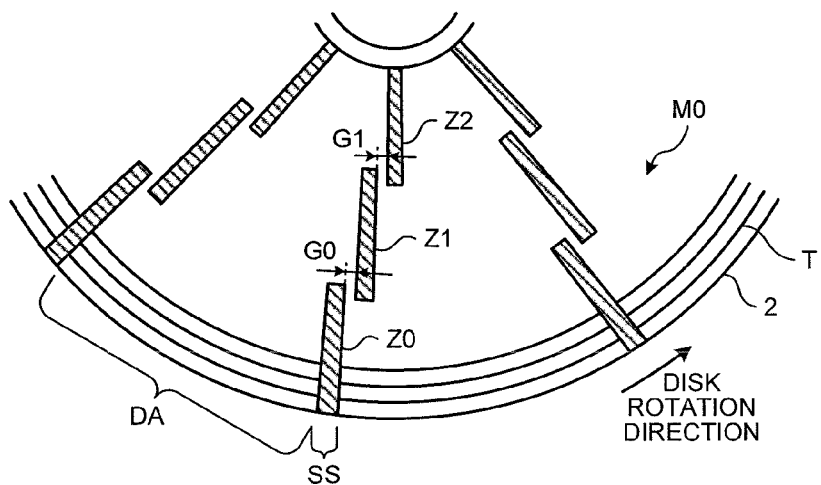
FIG. 2B is a diagram illustrating a method of dividing servo areas into zones.

The servo areas SS are, as illustrated in FIG. 2B, divided into zones Z0 to Z2 and are arranged to deviate in the circumferential direction. In this case, the zones Z0 and Z1 are arranged such that their ends overlap each other with a gap G0 therebetween, and the zones Z1 and Z2 are arranged such that their ends overlap each other with a gap G1 therebetween. Also, in the example of FIG. 2B, a method of dividing servo areas SS into three zones Z0 to Z2 has been described, but servo areas SS can also be divided into any number of zones, no less than two. The zones Z0 to Z2 can be configured such that write frequencies of the servo areas SS are different from each other. In the example of FIG. 2B, the zone Z0 of the outer circumference side can have a write frequency, which is a reference frequency of a servo pattern, higher than that of the zone Z2 of the inner circumference side. For example, the write frequency in the zone Z0 may be set to 200 MHz, the write frequency in the zone Z1 may be set to 150 MHz, and the write frequency in the zone Z2 may be set to 100 MHz. By setting higher write frequencies at the outer circumference side than the inner circumference side, the space of the zones Z0 and Z1 can be reduced and the data areas DA can be increased, compared with the case of setting the same write frequency in the zones Z0 to Z2.

Figure 2C:
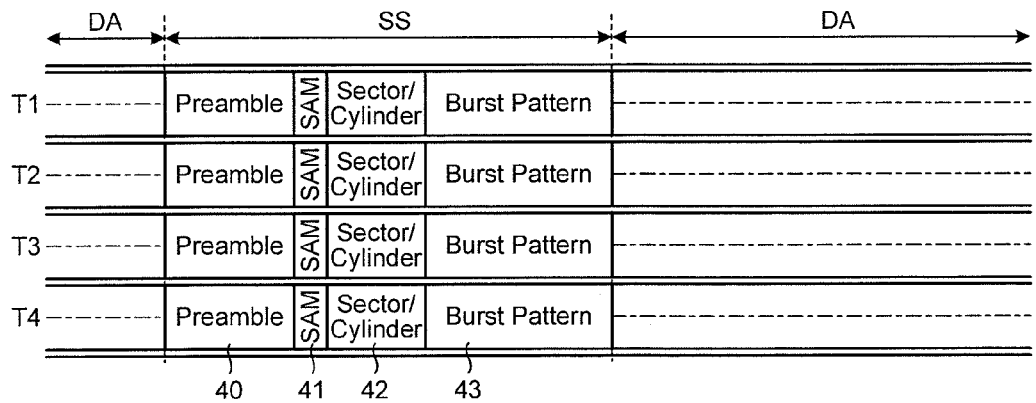
FIG. 2C is a diagram illustrating an example of a configuration of the servo areas of FIG. 2B.

In the servo areas SS, as illustrated in FIG. 2C, preambles 40, servo area marks 41, sector/cylinder information 42, and burst patterns 43 are written. Also, the sector/cylinder information 42 can assign servo addresses, in circumferential and radial directions, of the disk surface M0, and thus can be used for seek control for moving the magnetic head H0 to the target track. The burst patterns 43 can be used for tracking control for positioning the magnetic head H0 within the range of the target track. The burst patterns 43 may be null-type burst patterns or area-type burst patterns, or may be phase difference-type patterns.

Referring back to FIG. 1, as illustrated in FIG. 1, the magnetic disk device is provided with a voice coil motor 4 configured to drive the arms A0 to A3, and is also provided with a spindle motor 13 configured to rotate the magnetic disks 2 and 3 through the spindle 14. Also, the voice coil motor 4 may be configured to drive the arms A0 to A3 in an interlinked manner or drive the arms A0 to A3 individually.

The magnetic disks 2 and 3, the magnetic heads H0 to H3, the arms A0 to A3, the voice coil motor 4, the spindle motor 13, and the spindle 14 are accommodated in a case 1.

The magnetic disk device is also provided with a magnetic recording controller 5, and the magnetic recording controller 5 is provided with a head controller 6, a power controller 7, a read/write channel 8, and a hard disk controller 9. The head controller 6 is provided with a write current controller 6A and a reproduced signal detector 6B. The power controller 7 is provided with a spindle motor controller 7A and a voice coil motor controller 7B. The hard disk controller 9 is provided with a head position controller 9A and a switching position storage module 9B.

The head controller 6 can amplify signals during record and reproduction. The write current controller 6A can control the write current flowing through the magnetic heads H0 to H3. The reproduced signal detector 6B can detect signals read by the magnetic heads H0 to H3. The power controller 7 can drive the voice coil motor 4 and the spindle motor 13. The spindle motor controller 7A can control the rotation of the spindle motor 13. The voice coil motor controller 7B can control the driving of the voice coil motor 4. The read/write channel 8 can convert signals reproduced by the magnetic head H0 to H3 into data formats handled by a host 12 or can convert data output from the host 12 into signal formats recorded by the magnetic heads H0 to H3. Such format conversion includes DA conversion or encoding. Furthermore, the read/write channel 8 can perform decoding of signals reproduced by the magnetic heads H0 to H3 or can perform code modulation of data output from the host 12. The hard disk controller 9 can perform record/reproduction control based on instructions from the host 12 or can exchange data between the host 12 and the read/write channel 8. The head position controller 9A can perform seek control of the magnetic heads H0 to H3 based on a model position and a model velocity obtained from a model, which simulates the magnetic heads H0 to H3. The head position controller 9A can correct the model position and the model velocity, at the time of switching of the zones Z0-Z2, such that variation of sampling time resulting from gaps G0 and G1 between the zones Z0 to Z2 is reflected. The switching position storage module 9B can store servo addresses of the sector/cylinder information 42 corresponding to switching positions of the zones Z0 to Z2.

Also, the magnetic recording controller 5 is connected to the host 12. The host 12 may be a personal computer configured to deliver a write instruction or a read instruction to the magnetic disk device, or may be an external interface.

While the magnetic disks 2 and 3 are rotated by the spindle motor 13, signals are read from the disk surfaces M0 to M3 through the magnetic heads H0 to H3, respectively, and are detected by the reproduced signal detector 6B. The signals detected by the reproduced signal detector 6B are subjected to data conversion by the read/write channel 8 and then sent to the hard disk controller 9. Then, based on burst patterns 43 included in the signals detected by the reproduced signal detector 6B, tracking control of the magnetic heads H0 to H3 is performed by the hard disk controller 9. Furthermore, based on sector/cylinder information 42 included in the signals detected by the reproduced signal detector 6B, head positions of the magnetic disks 2 and 3 are calculated, and seek control is performed such that the magnetic heads H0 to H3 come close to target positions. In this case, the head position controller 9A can estimate the velocity of the magnetic heads H0 to H3 based on a model position and a model velocity obtained from a model, which simulates the magnetic heads H0 to H3, and control the amount of manipulation of the magnetic heads H0 to H3 (current value of the voice coil motor 4) such that the magnetic heads H0 to H3 come close to the target positions.

Also, the head position controller 9A compares a servo address, which is stored in the switching position storage module 9B, with a servo address included in the sector/cylinder information 42 read from the magnetic disks 2 and 3. When the servo address stored in the switching position storage module 9B and the servo address included in the sector/cylinder information 42 read from the magnetic disks 2 and 3 are identical to each other, it is determined that there is switching of the zones Z0 to Z2, and the model position and the model velocity are corrected such that variation of sampling time resulting from gaps G0 and G1 between the zones Z0 to Z2 is reflected.

Figure 3A:
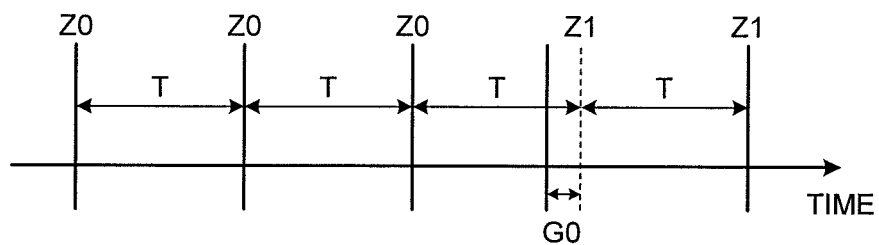
FIG. 3A is a diagram illustrating a relation between a gap G0 and sampling time T when switching from a zone Z0 to a zone Z1 of FIG. 2B.
Figure 3B:
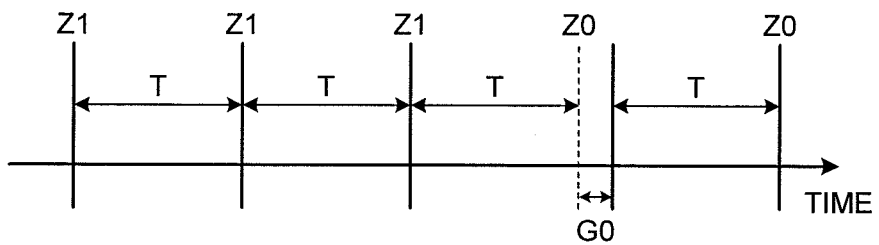
FIG. 3B is a diagram illustrating a relation between the gap G0 and the sampling time T when switching from the zone Z1 to the zone Z0 of FIG. 2B.

FIG. 3A illustrates a relation between the gap G0 and the sampling time T when switching from the zone Z0 to the zone Z1 of FIG. 2B, and FIG. 3B illustrates a relation between the gap G0 and the sampling time T when switching from the zone Z1 to the zone Z0 of FIG. 2B.

For example, the amount of manipulation of the magnetic head H0 is calculated for each sampling time T based on a model position and a model velocity obtained from a model, which simulates the magnetic head H0. The sampling time T refers to a timing interval during which the magnetic heads H0 to H3 pass over the servo areas SS on the disk surfaces M0 to M3, which rotate at a predetermined rate, and control is performed at that timing. When the position of the magnetic head H0 switches from the zone Z0 to the zone Z1, as illustrated in FIG. 3A, the sampling time T becomes shorter as much as time taken to move through the gap G0. Furthermore, when the position of the magnetic head H0 switches from the zone Z1 to the zone Z0, as illustrated in FIG. 3B, the sampling time T becomes longer as much as time taken to move through the gap G0. The gap G0 is provided, as illustrated in FIG. 2B, so as to space the zones Z0 and Z1 apart from each other, and, when the zones are switched, the sampling time varies as much as the proportion of the gap G0. Such a proportion of variation will herein be referred to as time taken to move through the gap.

For this reason, when the sampling time T has become shorter as much as the time taken to move through the gap G0, the head position controller 9A corrects the model position and the model velocity in response to the shortened proportion and, when the sampling time T has become longer as much as the time taken to move through the gap G0, the head position controller 9A corrects the model position and the model velocity in response to the lengthened proportion.

This makes it possible to reflect the proportion of variation of sampling time T in the model position and the model velocity, thereby reducing the transient response of the model-following seek control system and lowering seek noise. Also, the same manipulation is performed even when the position of the magnetic head H0 switches between the zone Z1 and the zone Z2.

Figure 4:
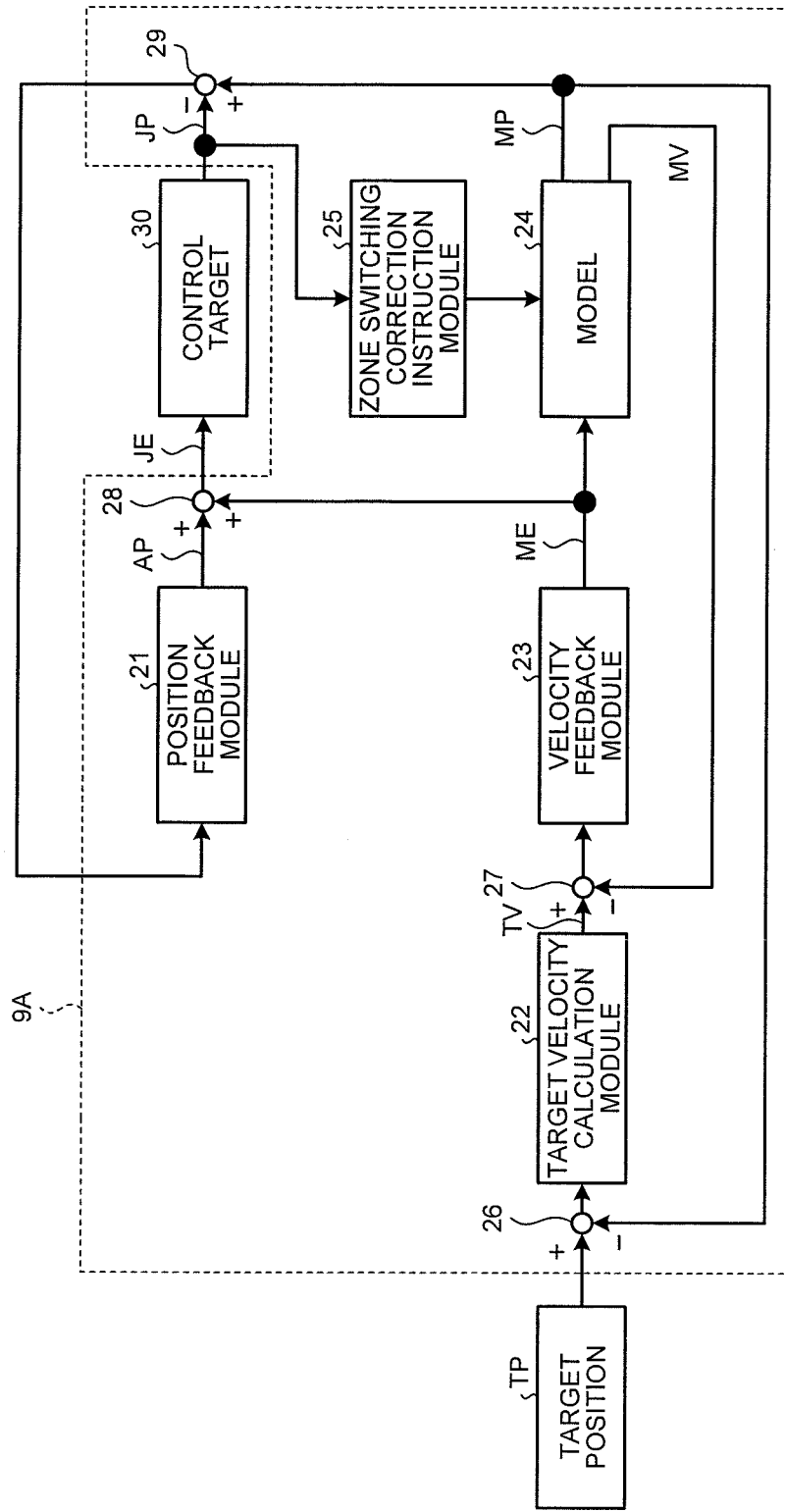
FIG. 4 is a block diagram illustrating a schematic configuration of a head position controller of FIG. 1.

FIG. 4 is a block diagram illustrating a schematic configuration of the head position controller of FIG. 1.

Referring to FIG. 4, the head position controller 9A is provided with a model 24 configured to calculate a model position MP and a model velocity MV by simulating a control target 30, a subtracter 26 configured to subtract the model position MP from a target position TP, a target velocity calculation module 22 configured to calculate a target velocity TV based on the result of subtraction by the subtracter 26, a subtracter 27 configured to subtract the model velocity MV from a target velocity TV, a velocity feedback module 23 configured to output a model manipulation amount ME to the model 24 such that the result of subtraction by the subtracter 27 comes close to zero, a subtracter 29 configured to subtract a head position JP from the model position MP, a position feedback module 21 configured to output a head position correction amount AP such that the result of subtraction by the subtracter 29 comes close to zero, an adder 28 configured to add the head position correction amount AP and the model manipulation amount ME and output a head manipulation amount JE to the control target 30, and a zone switching correction instruction module 25 configured to instruct the model 24 to perform zone switching correction based on the head position JP. In the case of the configuration of FIG. 1, the control target 30 includes respective magnetic heads H0 to H3, the arms A0 to A3, and the voice coil motor 4. The processing by the head position controller 9A can be executed by firmware.

In the case of tracking control, by setting the model manipulation amount ME to zero and setting the model position MP to the target position TP, the model 24 is separated from the tracking control system. The head position JP of the control target 30 is then calculated based on burst patterns 43 read from the magnetic disks 2 and 3. The head manipulation amount JE is then calculated such that the difference between the head position JP and the target position TP comes close to zero, and the current value of the voice coil motor 4 is controlled in response to the head manipulation amount JE, thereby positioning the magnetic heads H0 to H3.

Meanwhile, in the case of seek control, the model position MP and the model velocity MV are calculated by means of the model 24, and the target velocity TV is calculated based on the difference between the target position TP and the model position MP. The model manipulation amount ME is then calculated such that the difference between the target velocity TV and the model velocity MV comes close to zero.

Also, the head position JP of the control target 30 is calculated based on sector/cylinder information 42 read from the magnetic disks 2 and 3. The head position correction amount AP is then calculated such that the difference between the model position MP and the head position JP comes close to zero, and the head manipulation amount JE is calculated by adding the head position correction amount AP to the model manipulation amount ME. The magnetic heads H0 to H3 are then positioned by controlling the current value of the voice coil motor 4 in response to the head manipulation amount JE.

In the zone switching correction instruction module 25, a servo address stored in the switching position storage module 9B and a servo address included in sector/cylinder information 42 read from the magnetic disks 2 and 3 are compared with each other. When the servo address stored in the switching position storage module 9B and the servo address included in the sector/cylinder information 42 read from the magnetic disks 2 and 3 are identical to each other, it is determined that there is switching of the zones Z0 to Z2, and the model 24 is instructed to correct the model position and the model velocity.

Figure 5:
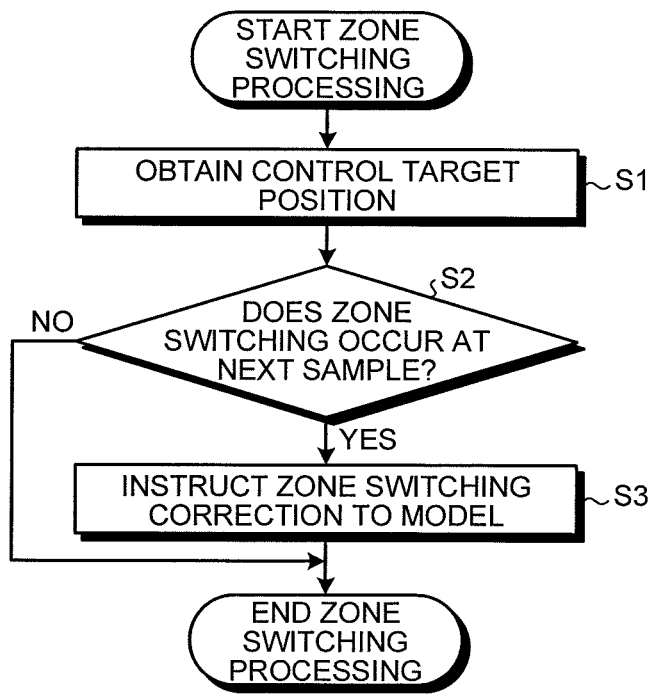
FIG. 5 is a flow chart illustrating an operation of a zone switching correction instruction module of FIG. 3.

FIG. 5 is a flow chart illustrating an operation of the zone switching correction instruction module of FIG. 3.

Referring to FIG. 5, the position of the control target 30 is obtained by obtaining a servo address included in sector/cylinder information 42 read from the magnetic disks 2 and 3 (S1).

Next, a servo address stored in the switching position storage module 9B and the servo address included in sector/cylinder information 42 read from the magnetic disks 2 and 3 are compared with each other. When the servo address stored in the switching position storage module 9B and the servo address included in the sector/cylinder information 42 read from the magnetic disks 2 and 3 are identical to each other, it is determined that there is switching of the zones Z0 to Z2 (S2, Yes), and the model 24 is instructed to correct the model position MP and the model velocity MV (S3).

On the other hand, when the servo address stored in the switching position storage module 9B and the servo address included in the sector/cylinder information 42 read from the magnetic disks 2 and 3 are not identical to each other, it is determined that there is no switching of the zones Z0 to Z2 (S2, No), and the instruction to correct the model position MP and the model velocity MV is skipped.

Figure 6:
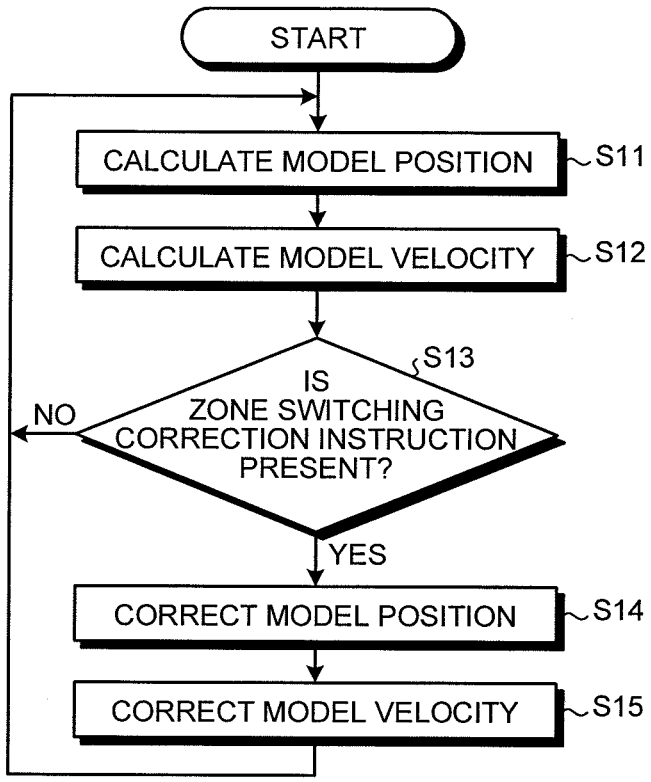
FIG. 6 is a flow chart illustrating an operation of a model of FIG. 3.

FIG. 6 is a flow chart illustrating an operation of the model of FIG. 3.

Referring to FIG. 6, the model 24 calculates a model position MP and a model velocity MV (Sil, S12). Assuming that the model 24 is expressed as an inertial system having mass, the model position MP and the model velocity MV can be obtained per one sample during an elapse from time k to time k+1, using Equations (1) and (2) below.

$$MPB(k+1)=MPB(k)+MVB(k)+A1*ME(k) \quad (1)$$

$$MVB(k+1)=MVB(k)+A2*ME(k) \quad (2)$$

where MPB(k+1) is a model position before correction, MVB(k+1) is a model velocity before correction, ME(k) is a model manipulation amount, A1 and A2 are gains.

Next, it is determined whether there is a correction instruction from the zone switching correction instruction module 25 (S13), and, when there is no correction instruction (S13, No), the processing of S11 and S12 is repeated.

On the other hand, when there is a correction instruction in S13 (S13, Yes), the model 24 corrects the model position MP and the model velocity MV (S14, S15). Assuming that the zones Z0-Z2 are switched between time k and time k+1, the correction of the model position MP and the model velocity MV can be obtained using Equations (3) and (4) below:

$$MPA(k+1)=MPB(k+1)+MVB(k+1)*dt/T+A1*ME(k)*(dt/T)^2 \quad (3)$$

$$MVA(k+1)=MVB(k+1)+A2*ME(k)*dt/T \quad (4)$$

where MPA(k+1) is a model position after correction, MVA(k+1) is a model velocity after correction, T is sample time, and dt is gap time. Also, dt can have a positive or negative value according to the seek direction of the magnetic heads H0 to H3 and the arrangement of the zones Z0 to Z2. For example, when the sampling time T becomes shorter as much as the time taken to move through the gap G0 as illustrated in FIG. 3A, dt is negative, and, when the sampling time T becomes longer as much as the time taken to move through the gap G0, dt is positive.

When the model 24 is described as an inertial system having mass, the use of the above Equations (3) and (4) makes it possible to reflect the proportion of variation of sampling time T, which results from the gap time dt, in the model position MP and the model velocity MV.

Also, the gap time dt of Equations (3) and (4) can be set to be a common value with regard to the magnetic heads H0 to H3 and the zones Z0 to Z2, or can be calibrated with regard to respective magnetic heads H0 to H3 or respective switching points of the zones Z0 to Z2. Such calibration of the gap time dt with regard to respective magnetic heads H0 to H3 or respective switching points of the zones Z0 to Z2 guarantees that, even if there is variation of intervals of the gaps G0 and G1 between the disk surfaces M0 to M3 and the zones Z0 to Z2, degradation of precision of correction of the model position MP and the model velocity MV can be prevented.

Second Embodiment

Although the first embodiment has been described in regard to a method of reflecting the proportion of variation of sampling time T, which results from the gap time dt, in the model position MP and the model velocity MV, it is also possible to reflect the proportion of plant variation alone in the model position MP and the model velocity MV, without using the gap time dt. In this case, the correction of the model position MP and the model velocity MV can be obtained, when the velocity of the control target 30 of FIG. 4 is locally constant, assuming that the zones Z0 to Z2 are switched between time k and time k+1, using Equations (5) and (6) below.

$$MPA(k+1)=MPB(k+1)+JPA(k+1)-JPB(k+1) \quad (5)$$

$$JPB(k+1)=2*JPA(k)-JPA(k-1) \quad (6)$$

where JPA(k+1) is a head position of the control target 30, and JPB(k+1) is a predicted position of the control target 30.

Figure 7:
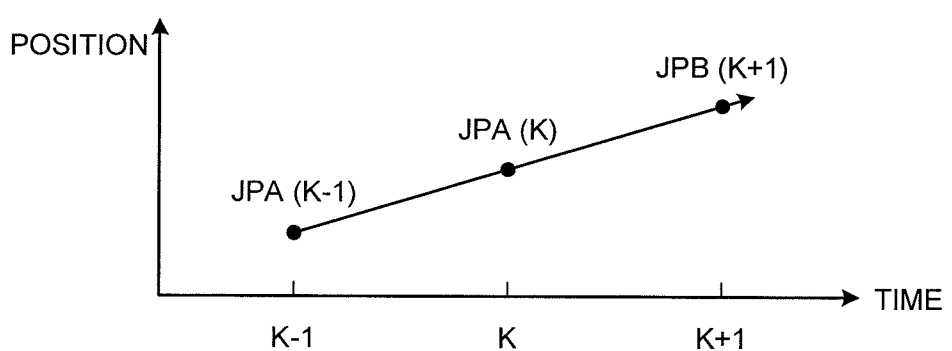
FIG. 7 is a diagram describing a method of calculating a predicted position of a control target.

FIG. 7 is a diagram describing a method of calculating a predicted position of the control target.

Referring to FIG. 7, assuming that the velocity of the control target 30 is locally constant, JPA(k)-JPA(k−1) and JPB(k+1)-JPA(k) become equal. For this reason, the predicted position when an elapse has occurred from time k to time k+1 can be obtained by adding the distance when an elapse has occurred from time k−1 to time k to the head position at time k, and Equation (6) can be obtained.

By reflecting the proportion of plant variation alone in the model position MP and the model velocity MV, the gap time dt can be made to disappear from Equations (5) and (6). This guarantees that, even if there is variation of intervals of the gaps G0 and G1 between the disk surfaces M0 to M3 and the zones Z0 to Z2, degradation of correction accuracy of the model position MP and the model velocity MV can be prevented without calibrating the gap time dt with regard to respective magnetic heads H0 to H3 or respective switching points of the zones Z0 to Z2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
magnetic heads;
a magnetic disk in which servo patterns having different write frequencies are divided and recorded into a plurality of zones; and
a head controller configured to correct a model position and a model velocity obtained from a model simulating the magnetic head, at the time of switching of the zones, so as to reflect variation of sampling time resulting from gaps between the zones when performing seek control of the magnetic heads based on the model position and the model velocity, wherein,
when the model is expressed as an inertial system, the zones are switched between time k and time k+1, a model position before correction is MPB(k+1), a model velocity before correction is MVB(k+1), a model manipulation amount is ME(k), sample time is T, gap time is dt, and A1 and A2 are gains,
a model position after correction MPA(k+1) and a model velocity after correction MVA(k+1) are given by equations:

$$MPA(k+1)=MPB(k+1)+MVB(k+1)*dt/T+A1*ME(k)*(dt/T)^2$$

$$MVA(k+1)=MVB(k+1)+A2*ME(k)*dt/T.$$

2. The magnetic disk device of claim 1, wherein
the gap time dt switches between positive and negative values according to seek direction of the magnetic heads and arrangement of the zones.

3. The magnetic disk device of claim 1, wherein
the gap time dt is calibrated with regard to respective magnetic heads or respective switching points of the zones.

4. A magnetic disk device, comprising:
magnetic heads;
a magnetic disk in which servo patterns having different write frequencies are divided and recorded into a plurality of zones; and
a head controller configured to correct a model position and a model velocity obtained from a model simulating the magnetic head, at the time of switching of the zones, so as to reflect variation of sampling time resulting from gaps between the zones when performing seek control of the magnetic heads based on the model position and the model velocity, wherein,
when the model is expressed as an inertial system, the zones are switched between time k and time k+1, a model position before correction is MPB(k+1), and a head position of the magnetic heads is JPA(k+1),
a model position after correction MPA(k+1) and a predicted position of the magnetic heads JPB(k+1) are given by equations:

$$MPA(k+1)=MPB(k+1)+JPA(k+1)-JPB(k+1)$$

$$JPB(k+1)=2*JPA(k)-JPA(k-1),$$

5. A method of controlling magnetic heads of a magnetic disk device including a magnetic disk in which servo patterns having different write frequencies are divided and recorded into a plurality of zones, the method comprising
correcting a model position and a model velocity obtained from a model simulating the magnetic heads, at the time of switching of the zones, so as to reflect variation of sampling time resulting from gaps between the zones when performing seek control of the magnetic heads based on the model position and the model velocity, wherein,
when the model is expressed as an inertial system, the zones are switched between time k and time k+1, a model position before correction is MPB(k+1), a model velocity before correction is MVB(k+1), a model manipulation amount is ME(k), sample time is T, gap time is dt, and A1 and A2 are gains,
a model position after correction MPA(k+1) and a model velocity after correction MVA(k+1) are given by equations:

$$MPA(k+1)=MPB(k+1)+MVB(k+1)*dt/T+A1*ME(k)*(dt/T)^2$$

$$MVA(k+1)=MVB(k+1)+A2*ME(k)*dt/T,$$

or wherein,
when the model is expressed as an inertial system, the zones are switched between time k and time k+1, a model position before correction is MPB(k+1), and a head position of the magnetic heads is JPA(k+1),
a model position after correction MPA(k+1) and a predicted position of the magnetic heads JPB(k+1) are given by equations:

$$MPA(k+1)=MPB(k+1)+JPA(k+1)-JPB(k+1)$$

$$JPB(k+1)=2*JPA(k)-JPA(k-1).$$

6. The method of claim 5, wherein
the gap time dt switches between positive and negative values according to seek direction of the magnetic heads and arrangement of the zones.

7. The method of claim 5, wherein
the gap time dt is calibrated with regard to the respective magnetic heads or respective switching points of the zones.

* * * * *